Oct. 29, 1968  HANS-JOACHIM M. FÖRSTER ET AL  3,408,047
ROTOR OF A HYDRODYNAMIC UNIT
Filed May 26, 1966

INVENTORS
HANS-JOACHIM M. FÖRSTER
JOSEF A. HELMER

BY  *Disher + Craig*
ATTORNEYS

United States Patent Office 3,408,047
Patented Oct. 29, 1968

3,408,047
ROTOR OF A HYDRODYNAMIC UNIT
Hans-Joachim M. Förster, Stuttgart-Riedenberg, and Josef A. Helmer, Aich, Kreis Nurtingen, Germany, assignors to Daimler-Benz Aktiengesellschaft, Stuttgart-Unterturkheim, Germany
Filed May 26, 1966, Ser. No. 553,162
Claims priority, application Germany, June 2, 1965, D 47,417
13 Claims. (Cl. 253—77)

ABSTRACT OF THE DISCLOSURE

A pump or turbine wheel of hydrodynamic units, especially hydrodynamic couplings for vehicles, particularly motor vehicles, wherein the blades are provided with a plurality of radially outwardly and inwardly extending tabs at their outer and inner periphery, respectively, for engaging correspondingly shaped axially inwardly extending and opening slots provided in outer and inner sheet metal rings, respectively, that are secured within an outer and an inner recess having an abutting axially outwardly facing collar in the opposed inner walls of an annular shell-shaped wheel body.

BACKGROUND OF THE INVENTION

Figure 1:
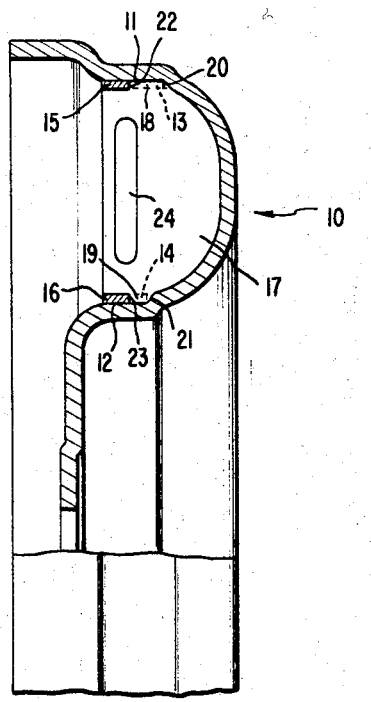

The present invention relates to pump or turbine wheels of hydrodynamic units, especially of a hydrodynamic coupling for vehicles, in particular motor vehicles. Pump and turbine wheels for hydrodynamic couplings consist normally of an annular shell-shaped wheel body pressed out of comparatively strong and heavy sheet metal which serves for receiving the blades and for absorbing the reaction forces produced thereby. However, the aforementioned force-absorption function requires a correspondingly careful and completely unobjectionable securing of the blades in the wheel body.

With a known construction of a pump wheel of the aforementioned type, three sharp-edged, radially directed longitudinal indentations or recesses are pressed in, per each blade, within the shell-shaped wheel body for securing the blades whereby one indentation or depression each is arranged radially outwardly as well as radially inwardly and the third depression or indentation is arranged approximately in the center between the two other depressions or indentations in the shell base or bottom. The blades provided correspondingly with bottoms or roots are inserted into the recesses or indentations and are subsequently secured in place by brazing. Since the brazing material—copper being used in general—is comparatively soft, the force is transmitted essentially directly by the blade roots or bottoms to the wheel body by way of the depressions. Consequently, care must be taken for an accurate and exact fitting of the blade roots or bottoms in the recesses in order to prevent a damage of the brazing seam and therewith a loosening of the blade. However, the realization of the recesses or indentations into the inner wall of the shell-shaped wheel body is very difficult from technological point of view because, on the one hand, one can get to the unwieldly and complex workpiece with the punching tool only with difficulty and, on the other, a partial shearing off of the material at the punching place has to be avoided under all circumstances.

Furthermore, a rapid wear of the punching tool takes place by reason of the small tolerances with the relatively small dimensions of the recesses or indentations.

THE INVENTION

The present invention now aims at eliminating the aforementioned disadvantages. As solution to the underlying problem, the present invention proposes that one sheet metal band or strip each is secured onto the interior walls of the annularly shaped shell forming the wheel body and serving for the accommodation of the blades—both at the inner shell rim as well as along the oppositely disposed wall—which sheet metal band or strip is provided with transverse slots, is bent in to the shape of a ring and is adapted to the contours of the corresponding shell walls, further that the blades are provided at each of the outer and inner ends thereof with a tab or lug corresponding to the respective transverse slots of the sheet metal band ring and that the blades engage with the lugs or tabs thereof into the transverse slots of the rings. The rings of sheet metal band may be secured in any suitable known manner at the wheel body, for example, by riveting or also preferably by protective gas brazing, i.e., brazing in a protective gas atmosphere whereby connected brazing seams are appropriately provided which in this case can transmit also forces without difficulty.

The securing of the blades in the wheel body according to the present invention offers above all the advantage that the disadvantageous punching of recesses or indentations into the wheel body is now dispensed with. The punching of the transverse slots into the sheet metal bands is, in contrast thereto, very uncomplicated. Thus, for example, the sheet metal band may run through the punching machine in an endless manner and may be cut off after the punching operation into the desired length. A facilitation of the punching operation and a considerable increase in the useful life of the work tool may be achieved according to a further feature in accordance with the present invention, especially in that the ring of sheet metal band consists of relatively thin sheet metal material, corresponding approximately to the thickness or gauge of the blades The thin-walled construction of the sheet metal band rings further enables a good adaptation thereof to the inner contours of the wheel body. The latter can be constructed, in principle, in any suitable desired manner, for example, in the manner of a ring with an approximately semi-circular cross section, i.e., with an inner wall which is curved on all sides thereof. In that case, the rings of sheet metal band may be adapted to the inner contours of the wheel body after insertion thereof into the wheel body by subsequent conventional rolling. A preferred construction of the present invention, however, provides that the shell wall sections serving for the securing of the sheet metal band rings are constructed of cylindrical shaped and are each provided with a collar in the direction toward the shell bottom. As a result of this construction of the inner walls of the wheel body, an after-rolling of the sheet metal band rings can be dispensed with in most cases so that this operation can be saved. The collars in the inner walls assure additionally an axial support and a good fitting and alignment of the rings without special means.

The cylindrical shaped shell wall sections and correspondingly the sheet metal band rings may be made of any suitable length in the axial dimensions thereof, for example, of equal dimensions for reasons of simplicity of manufacture. However, the present invention preferably proposes that the sheet metal band ring arranged at the inner rim of the wheel body shell and correspondingly its transverse slots are constructed about half as wide as the outer sheet metal band ring and the slots thereof. This construction of the sheet metal band rings is particularly advantageous for such blades which are appropriately constructed radially outwardly thereof somewhat wider in the axial dimensions for purposes of a good hydraulic efficiency and may be provided thereat with correspondingly wider lugs or tabs for the securing thereof in the outer sheet metal band ring. The latter then transmits also the larger part of the blade forces to the wheel body.

The assembly of the sheet metal band rings as well as of the blades is, in principle, at the free choice of the production expert and can be realized in any known manner. However, the present invention recommends in connection therewith to insert at first the blades into the wheel body—for example, with the aid of a magnetic device which has the desired subdivision—and subsequently thereto to slip over and emplace the two sheet metal band rings axially over the blades. The sheet metal band rings are accordingly arranged in such a manner that the slot apertures are directed axially toward the inside of the shell and that the blades are axially supported, on the one hand, at the collars of the shell and, on the other, at the closed slot ends of the sheet metal band rings. A spot fastening of each ring, for example, at three places then suffices in order to impart to the rings as well as to the blades a sufficient preliminary support. The final protective gas brazing takes place subsequent thereto. The advantage of the aforementioned construction essentially consists in that also with an insufficient brazing of the blades, no lossening and disengagement thereof out of the securing support can take place. Any eventual radial slipping out of the blade tabs or lugs out of the slot— namely when the blades bend through or buckle under the fluid pressure—can be prevented according to a further feature of the present invention in that the blades are provided with at least one radially arranged embossment or stiffening corrugation. The blade receives thereby—also with comparatively thin-walled construction—the requisite rigidity in order to prevent a bending or even buckling.

Another construction of the present invention proposes such an arrangement of the two sheet metal band rings that the slot apertures extend axially in the direction of the shell rim and that the sheet metal band rims are axially supported at the collars. In this case, the assembly of the sheet metal rings takes place at first whereby care must be taken that the slots of both sheet metal band rings are mutually coordinated in the radial direction, i.e., are aligned in the radial direction. After assembly of the sheet metal band rings and alignment of the slots, the blades can then be inserted individually into the slots, can be peaned over and brazed in position. The advantage of the last-mentioned construction essentially consists in that prior to the assembly of the blades, an accurate adaptation of the rings to the wheel body walls may possibly be realized in a simple manner, for example, by conventional rolling operations.

Accordingly, it is an object of the present invention to provide a rotor, and more particularly a pump or turbine wheel construction for a hydrodynamic transmission unit which avoids by extremely simple means the aforementioned shortcomings and drawbacks encountered with the prior art constructions.

Another object of the present invention resides in a pump or turbine wheel construction for a hydrodynamic transmission unit which obviates the need for complicated preliminary pressing or punching operations, accurate fiitting and difficult assembly, as required with the prior art constructions.

A further object of the present invention resides in a rotor structure for a hydrodynamic transmission unit which not only assures long life of the work tools used in connection with the manufacture thereof but which additionally obviates the need for small tolerances without sacrificing completely satisfactory operation of the assembled rotor unit.

Still another object of the present invention resides in a rotor unit for hydrodynamic transmissions which can be easily manufactured and assembled utilizing appropriate mass production techniques while at the same time obtaining a rotor assembly which is less prone to premature wear and tear, for example, by loosening of the blades under pressure.

Still a further object of the present invention resides in a rotor unit of the type described above which exhibits greater rigidity as to the blade assembly and therewith a greater length of useful life while at the same time permitting a construction improving the hydraulic efficiency of the hydrodynamic unit.

Another object of the present invention resides in a pump or turbine wheel for hydrodynamic transmissions which is so constructed and arranged that a disengagement or loosening of the blades from the supports thereof is not feasible even in case of flaws in the brazing joints.

Figure 2:
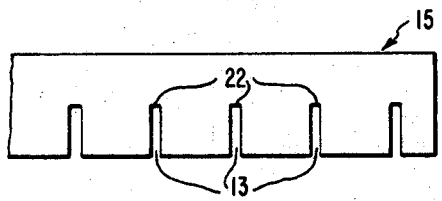

These and further objects, features and advantages of the present invention will become more obvious from the following description when taken in connection with the accompanying drawing which shows, for purposes of illustration only, one embodiment in accordance with the present invention, and wherein:

FIGURE 1 is a partial axial cross-sectional view through a pump wheel in accordance with the present invention; and FIGURE 2 is a partial plan view on the ring of sheet metal band used in accordance with the present invention and unfolded into the plane of the drawing.

Referring now to the drawing wherein like reference numerals are used throughout the two views to designate like parts and more particularly to FIGURE 1, reference numeral 10 designates therein a wheel body which is constructed as shell-shaped ring. One sheet metal band ring 15 and 16 each provided with transverse slots 13 and 14 is secured radially outwardly as well as radially inwardly along the cylindrical wall sections 11 and 12 of the wheel body 10, respectively. FIGURE 2 illustrates particularly well the band and the transverse slots thereof. The outer sheet metal band ring 15 is about twice as wide as the inner sheet metal band ring 16 and the same is also true as to the ratio of the slots 13 and 14 which are also approximately in the ratio of 2:1. The pump blades 17 (FIGURE 1) arranged within the shell-shaped wheel body 10 are provided radially outwardly and radially inwardly thereof with the tabs 18 and 19, which correspond in their dimensions to the slots 13 and 14, respectively. The tabs 18 and 19 engage into the slots 13 and 14 and serve therewith for the securing of the blades 17 at the sheet metal band rings 15 and 16 and for the force transmission onto the same.

The blades 17 are thereby axially supported by means of the tabs 18 and 19, on the one hand, at the collars 20 and 21 formed in the wheel body 10 and on the other, at the closed ends 22 and 23 of the slots 13 and 14, respectively. The rings 15 and 16 of sheet metal band material are also supported at the collars 20 and 21 intermediate the blades 17 whereby the open slot ends are closed off by the collars 20 and 21. In this manner an axial loosening or disengagement of the blades 17 out of the wheel body 10 is rendered impossible. In order to prevent also an eventual slipping out in the radial direction on the part of the tabs 18 and 19 out of the slots 13 and 14, the blades 17 are each provided with one stiffening corrugation 24 which produces sufficient rigidity in order to prevent a bending or even buckling of the blades 17.

While we have shown and described one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A wheel structure for a hydrodynamic transmission unit, especially a pump or turbine wheel of a hydrodynamic coupling for vehicles and for rotation about an axis, comprising: a semitorodial axially opening shell having a cylindrical mounting surface and forming the wheel body; a ring-shaped band consisting of a sheet metal strip jointed at its opposite ends into a hollow cylinder and having a plurality of transverse slots axially opening toward the bottom of said shell; a plurality of blades in said shell and having radially extending tabs engaged in corresponding ones of said slots; means securing said band to said mounting surface for securely holding said blades in said shell.

2. A wheel structure according to claim 1, wherein said band is constructed of a single piece of metal.

3. A wheel structure for a hydrodynamic transmission unit, especially a pump or turbine wheel of a hydrodynamic coupling for vehicles for rotation about an axis, comprising annularly shaped shell means forming the wheel body and having inner wall means, ring shaped band means provided with transverse slots and secured to the inner wall means along the inner shell rim as well as at the oppositely disposed shell wall, blade means in said shell means having tabs at the radially outer and inner ends engaging into corresponding ones of said band means transverse slots wherein the shell wall sections serving for the securing of the band means are constructed of substantially cylindrical shape and are each provided with a radially extending collar portion in the direction toward the shell bottom and axially abutting with said band means.

4. The combination according to claim 3, wherein said band means consists of relatively thin-metal corresponding in thickness to that of the blade means.

5. A wheel structure according to claim 4, wherein the band means arranged at the inner rim of the wheel body shell means and the slots thereof are about half as wide as the outer band means and the slots thereof.

6. The combination according to claim 5, wherein said band means are so arranged that the slot apertures extend axially toward the inside of the shell means and that the blade means are axially supported on the one hand, at the collar portions in the shell means and, on the other, at the closed slot ends of the band means.

7. The combination according to claim 5, wherein said band means are so arranged that the slot apertures extend axially and open in the direction toward the collar portion and that the band means are supported at the collar portions.

8. The combination according to claim 6, wherein said blade means are provided with at least one radially extending stiffening corrugation.

9. A wheel structure according to claim 3, wherein the band means arranged at the inner rim of the wheel body shell means and the slots thereof are about half as wide as the outer band means and the slots thereof.

10. The combination according to claim 3, wherein said band means are so arranged that the slot apertures extend axially toward the inside of the shell means and that the blade means are axially supported, on the one hand, at the collar portions in the shell means and, on the other, at the closed slot ends of the band means.

11. The combination according to claim 10, wherein said blade means are provided with at least one radially extending stiffening corrugation.

12. The combination according to claim 3, wherein said band means are so arranged that the slot apertures extend axially in the direction toward the shell rim and that the band means are supported at the collar portions.

13. A wheel structure for a hydrodynamic transmission unit, especially a pump or turbine wheel of a hydrodynamic coupling for vehicles for rotation about an axis, comprising annularly shaped shell means forming the wheel body and having inner wall means, ring shaped band means provided with transverse slots and secured to the inner wall means along the inner shell rim as well as at the oppositely disposed shell wall, blade means in said shell means having tabs at the radially outer and inner ends engaging into corresponding ones of said band means transverse slots wherein said blade means are provided with at least one radially extending stiffening corrugation.

References Cited

UNITED STATES PATENTS

| | | | |
|---|---|---|---|
| 2,061,997 | 11/1936 | Dunn | 103—115 |
| 2,431,855 | 12/1947 | Zeidler. | |
| 2,493,240 | 1/1950 | Emmert | 103—115 |
| 2,763,215 | 9/1956 | Misch | 103—115 |
| 2,855,852 | 10/1958 | Gamble | 103—115 |

EVERETTE A. POWELL, JR., *Primary Examiner.*